(12) United States Patent
Kaucic et al.

(10) Patent No.: US 11,131,974 B2
(45) Date of Patent: Sep. 28, 2021

(54) CONTROLLING A DISPATCH OPERATION OF AN ENERGY STORAGE SYSTEM

(71) Applicant: General Electric Company, Schenectady, NY (US)

(72) Inventors: Robert A. Kaucic, Niskayuna, NY (US); David E. James, Clifton Park, NY (US); Herman Lucas Norbert Wiegman, Niskayuna, NY (US); Hullas Sehgal, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 10 days.

(21) Appl. No.: 16/288,347

(22) Filed: Feb. 28, 2019

(65) Prior Publication Data

US 2019/0196427 A1     Jun. 27, 2019

Related U.S. Application Data

(63) Continuation of application No. 14/833,498, filed on Aug. 24, 2015, now abandoned.

(51) Int. Cl.
*G05B 19/042* (2006.01)
*G05B 13/04* (2006.01)
*H02J 3/32* (2006.01)

(52) U.S. Cl.
CPC ......... *G05B 19/042* (2013.01); *G05B 13/041* (2013.01); *H02J 3/32* (2013.01); *G05B 2219/2639* (2013.01); *Y02B 70/30* (2013.01); *Y04S 20/20* (2013.01)

(58) Field of Classification Search
None
See application file for complete search history.

(56) References Cited

U.S. PATENT DOCUMENTS

| | | |
|---|---|---|
| 2003/0202344 A1 | 10/2003 | Kenny et al. |
| 2004/0230343 A1 | 11/2004 | Zalesski |
| 2005/0077881 A1 | 4/2005 | Capp et al. |
| 2008/0211230 A1 | 9/2008 | Gurin |
| 2009/0024255 A1 | 1/2009 | Penzenstadler et al. |
| 2010/0231045 A1 | 9/2010 | Collins et al. |
| 2011/0106322 A1 | 5/2011 | Ou |

(Continued)

FOREIGN PATENT DOCUMENTS

WO     WO 2012/106389        8/2012

*Primary Examiner* — Mohammad Ali
*Assistant Examiner* — Saad M Kabir
(74) *Attorney, Agent, or Firm* — Dority & Manning, P.A.

(57) ABSTRACT

Systems and methods of controlling a dispatch operation of an energy storage system are provided. In particular, a degradation value of a present dispatch state of an energy storage system can be determined. The present dispatch state can specify one or more energy storage units presently coupled to the system. The degradation value can be determined based at least in part on one or more operating parameters, such as temperature, open circuit voltage, charge or discharge current, and/or contactor life. The degradation value can then be compared against one or more degradation values associated with one or more candidate dispatch states. A dispatch state can then be selected based on the comparison. One or more energy storage units can be selectively coupled to the energy storage system based at least in part on the selected dispatch state.

19 Claims, 4 Drawing Sheets

(56) References Cited

U.S. PATENT DOCUMENTS

2011/0241428 A1 10/2011 Lai et al.
2012/0053750 A1 3/2012 Viassolo et al.
2012/0215368 A1 8/2012 Sharma
2013/0278269 A1* 10/2013 Steck ................. G01R 31/3278
324/418

* cited by examiner

CONTROLLING A DISPATCH OPERATION OF AN ENERGY STORAGE SYSTEM

PRIORITY CLAIM

The present application is a continuation of U.S. application Ser. No. 14/833,498 having a filing date of Aug. 24, 2015. The present application claims the benefit of priority to the '498 application and incorporates the '498 application herein by reference.

FIELD OF THE INVENTION

The present subject matter relates generally to energy storage systems and more particularly, to systems and methods of controlling a dispatch operation of one or more energy storage units in an energy storage system.

BACKGROUND OF THE INVENTION

Energy storage systems have become increasingly used to deliver power to utility grids either as part of standalone energy storage systems or as part of a renewable energy farm (e.g., a wind farm or solar farm) with an integrated energy storage system. Energy storage systems can include one or more battery banks or other energy storage units that can be coupled to the grid or other load via a suitable power converter. Energy storage systems are unique in that energy storage systems have the ability to both deliver and reserve energy for particular grid services.

Different energy storage units can perform differently in various operating conditions associated with an energy storage system. For instance, energy storage units can accumulate degradation and/or inefficiency in various operating conditions. As an example, sodium metal halide batteries can experience capacity fade at low discharge rates. As another example, sodium metal halide batteries can experience resistance rise effects at high voltage recharge rates. Such degradation and inefficiency can lead to a reduced lifespan of an energy storage system. Thus, there is a need for systems and methods of controlling an energy storage system to reduce inefficiency and/or degradation.

BRIEF DESCRIPTION OF THE INVENTION

Aspects and advantages of embodiments of the present disclosure will be set forth in part in the following description, or may be learned from the description, or may be learned through practice of the embodiments.

One example aspect of the present disclosure is directed to a method of controlling a dispatch operation of an energy storage system. The method includes receiving, by one or more control devices, data indicative of a present dispatch state associated with an energy storage system. The energy storage system includes a plurality of energy storage units coupled in parallel. The present dispatch state specifies the energy storage units presently coupled to the system. The method further includes identifying, by the one or more control devices, one or more candidate dispatch states associated with the energy storage system. Each of the one or more candidate dispatch states is different from the present dispatch state. The method further includes selecting, by the one or more computing devices, at least one of the one or more candidate dispatch states as a selected dispatch state based at least in part on a performance model. The performance model models the performance of the one or more candidate dispatch states as a function of one or more operating parameters. The method further includes controlling, by the one or more control devices, operation of the energy storage system based at least in part on the selected dispatch state.

Another example aspect of the present disclosure is directed to an energy storage system. The energy storage system includes a plurality of energy storage units coupled in parallel. The energy storage system further includes a system controller communicatively coupled to the plurality of energy storage units. The system controller includes at least one processor and a non-transitory computer-readable medium storing instructions that, when executed by the at least one processor, cause the system controller to perform operations. The operations include receiving data indicative of a present dispatch state associated with an energy storage system. The energy storage system includes a plurality of energy storage units coupled in parallel. The present dispatch state specifies the energy storage units presently coupled to the system. The operations further include identifying one or more candidate dispatch states associated with the energy storage system. Each of the one or more candidate dispatch states is different from the present dispatch state. The operations further include selecting at least one of the one or more candidate dispatch states as a selected dispatch state based at least in part on a performance model. The performance model models the performance of the one or more candidate dispatch states as a function of one or more operating parameters. The operations further include controlling operation of the energy storage system based at least in part on the selected dispatch state.

Yet another example aspect of the present application is directed to a system controller for controlling one or more energy storage units in an energy storage system. The system controller includes at least one processor and a non-transitory computer-readable medium storing instructions that, when executed by the at least one processor, cause the system controller to perform operations. The operations include receiving data indicative of a present dispatch state associated with an energy storage system. The energy storage system includes a plurality of energy storage units coupled in parallel. The present dispatch state specifies the energy storage units presently coupled to the system. The operations further include identifying one or more candidate dispatch states associated with the energy storage system. Each of the one or more candidate dispatch states is different from the present dispatch state. The operations further include selecting at least one of the one or more candidate dispatch states as a selected dispatch state based at least in part on a performance model. The performance model models the performance of the one or more candidate dispatch states as a function of one or more operating parameters. The operations further include controlling operation of the energy storage system based at least in part on the selected dispatch state.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
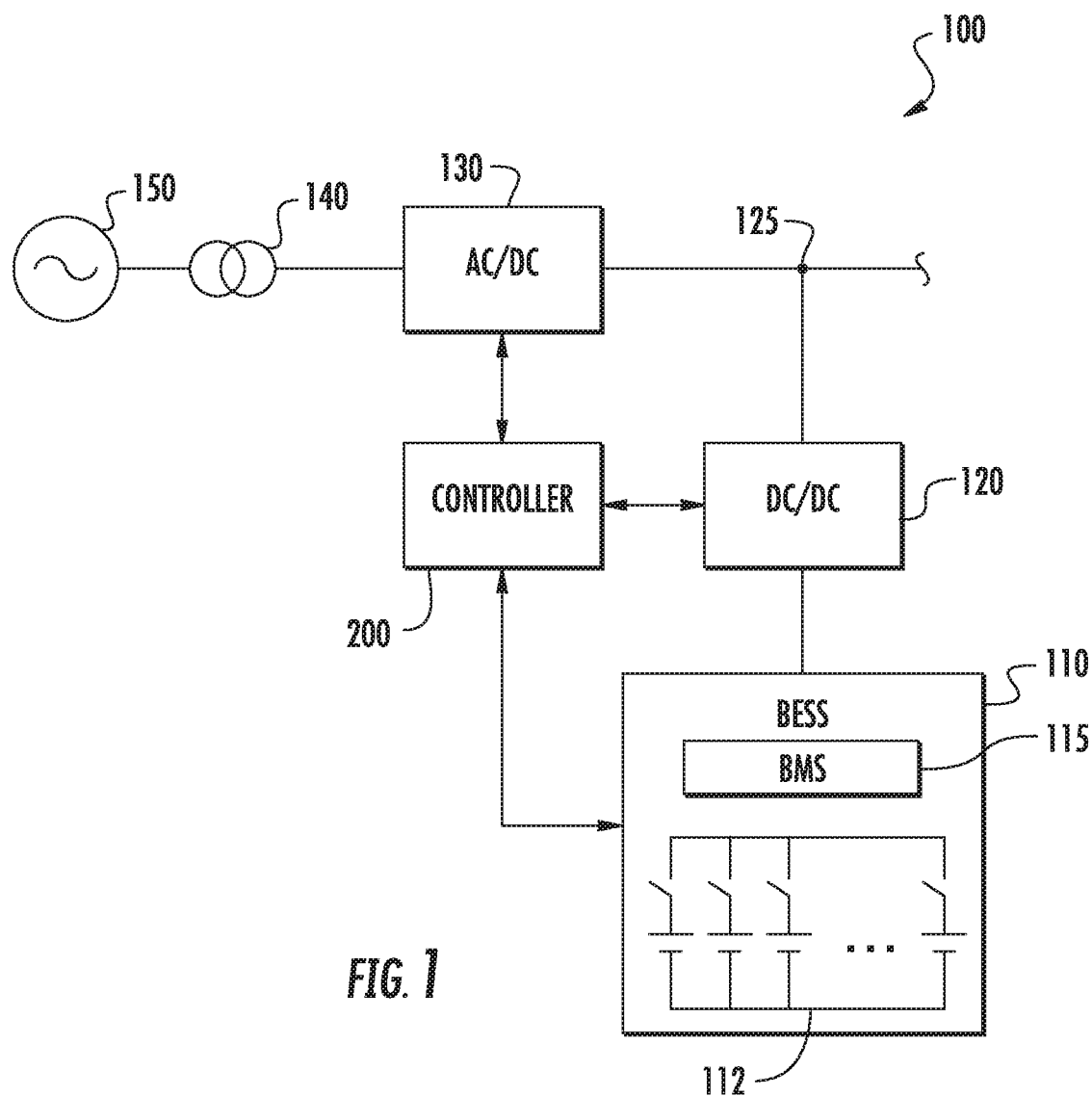
FIG. 1 depicts an example energy storage system according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to controlling a dispatch operation of a plurality of energy storage units in an energy storage system. In particular, a number of energy storage units can be dispatched (e.g., coupled to the energy storage system) to meet a power demand provided, for instance, by a power grid or other source. An energy storage unit may include one or more electrochemical cells. The plurality of energy storage units can make up a portion of an energy storage system. The energy storage system can include a plurality of energy storage units located on a single electrical bus, and/or a plurality of energy storage units remotely distributed using multiple electrical busses. Each energy storage unit can be coupled to a switch (e.g. one or more contactors). The switch can be selectively operable to couple the energy storage unit to a load (e.g. power grid or other load). In particular, the switch can include an open state and a closed state. The energy storage unit can be coupled to the system when the switch is in the closed state, and decoupled from the system when the switch is in the open state.

In example embodiments, upon receiving a power demand or commitment for a power grid or other load, a present dispatch state and a plurality of candidate dispatch states associated with the energy storage system can be identified. The present dispatch state can specify the energy storage units that are presently coupled to the system and the energy storage units that are presently decoupled from the system. Each candidate dispatch state can specify the energy storage units to potentially be coupled to the system and the energy storage units that are to potentially be decoupled from the system. In example embodiments, each candidate dispatch state can be different from the present dispatch state.

A degradation value can then be calculated for the present dispatch state and each candidate dispatch state. In particular, the degradation value for a dispatch state can be calculated at least in part by accessing a performance model associated with the energy storage system. The performance model can receive one or more inputs to determine a degradation value or other data indicative of one or more efficiency and/or degradation characteristics associated with the present dispatch state and each of the candidate dispatch states. The one or more inputs can include one or more operating parameters associated with the dispatch states. For instance, the one or more operating parameters can include data related to temperature, open circuit voltage, current and/or contactor life associated with each of the energy storage units to be coupled to the system. In this manner, the degradation value can be indicative of efficiency and/or degradation characteristics of the energy storage system, which can correspond to an overall life cycle performance trajectory associated with the energy storage system.

In example embodiments, the performance model can further take into account one or more operating constraints, such as for instance, power demand, battery power, battery current, voltage characteristic, and/or battery temperature. The one or more operating constraints may change over time. For instance, the power demand may change at various times of the day (and/or various times of the year) based at least in part on fluctuating grid conditions.

In addition, the performance model can take into account performance degradation for individual storage units to determine selection of units to couple and decouple from the system to improve performance. For instance, the model can take into consideration which energy storage units were previously coupled in a dispatch state so that a new dispatch state does not provide for the coupling or decoupling the same energy storage unit to the system each time a new dispatch state is determined.

Operation of the energy storage system can be controlled based at least in part on the degradation values of the candidate dispatch states of the energy storage system relative to the present dispatch state. For instance, a candidate dispatch state can be selected as a selected dispatch state based on the degradation value. The energy storage system can then be controlled by coupling the number of energy storage units to the system as specified by the selected dispatch state.

In this way, example aspects of the present disclosure can have a technical effect of improving the efficiency of an energy storage system by adjusting a dispatch state of the energy storage system based at least in part on one or more operating parameters. Similarly, example aspects of the present disclosure can have a technical effect of reducing degradation associated with an energy storage system by adjusting a dispatch state of the energy storage system based at least in part on one or more operating parameters.

In example embodiments, the energy storage system can be further controlled based at least in part on the one or more operating constraints. For instance, in such embodiments, a candidate dispatch state may only be selected if controlling the energy storage system in accordance with the candidate dispatch state would cause the energy storage system to operate within the bounds of the constraints. For instance, a candidate dispatch may only be selected if the energy storage system would output enough power to meet the power demand while operating in accordance with the candidate dispatch state. In this manner, a candidate dispatch state can be selected to meet a near term power commitment (e.g. power delivery or power acceptance) associated with a power application. As another example, a candidate dispatch state may only be selected if operating the energy storage system in accordance with the candidate dispatch state would cause the energy storage system to operate at a temperature below a predetermined temperature. As yet another example, the energy storage system can be controlled based at least in part on a state of charge difference between energy storage units. In this manner, a candidate dispatch may be selected only if operating the energy storage system in accordance with the candidate dispatch state would cause the state of charge difference between the energy storage units in the energy storage system to be maintained below a threshold.

In example embodiments, the plurality of candidate dispatch states can include every possible dispatch state (e.g. every possible combination of energy storage units that can be coupled to the system). For instance, each candidate dispatch state combination can be identified during one or more time periods. A degradation value can be calculated for each possible dispatch state. Operation of the energy storage system can then be controlled in accordance with the candidate dispatch state having the optimal degradation value. For instance, the optimal degradation value can be the lowest degradation value of the plurality of degradation values.

In alternative embodiments, one or more candidate dispatch states can be identified by incrementally adjusting a number of energy storage units to be coupled to the system during a plurality of incremental time periods. Degradation values for each candidate dispatch state can be calculated during each incremental time period. For instance, an optimization routine can be used to identify one or more candidate dispatch states by periodically adjusting the number of energy storage units to be coupled to the system in an incremental manner. In particular, incrementally adjusting the number of energy storage units to be coupled to the system can include increasing or decreasing the number of energy storage units to be coupled to the system relative to the number of energy storage units specified by the candidate dispatch state in accordance with which the energy storage system is presently operating.

Each incremental adjustment can have an effect on the degradation value of the energy storage system. For instance, each incremental adjustment (e.g. incremental increase or incremental decrease) can cause the degradation value of the energy storage system to increase, decrease, or remain constant. In example embodiments, the optimization routine can further include, for each time period, comparing the degradation value associated with the present candidate dispatch state (e.g. the most recently determined degradation value) to the degradation value associated with the candidate dispatch state identified in a previous time period (e.g. a previous candidate dispatch state). For instance, the degradation value associated with the present candidate dispatch state can be compared to the degradation value of the present dispatch state.

In example embodiments, if the degradation value associated with the present candidate dispatch state is less than the degradation value associated with the previous candidate dispatch state, the optimization routine can include selecting the present candidate dispatch state as a selected dispatch state. Operation of the energy storage system can then be controlled in accordance with the selected dispatch state. Controlling the operation of the energy storage system in this manner can include, for instance, controlling the operating state of one or more switches coupled to one or more energy storage units such that the number of energy storage units coupled to the system corresponds to the number specified in the selected candidate dispatch state.

If the degradation value associated with the present candidate dispatch state is not less than the degradation value associated with the previous incremental adjustment, the present candidate dispatch state may not be selected and operation of the energy storage system can be controlled such that no change is made to the dispatch state of the energy storage system. In particular, operation of the energy storage system can be controlled to maintain operation in accordance with the dispatch state selected most recently (e.g. the dispatch state in accordance with which the energy storage system is presently operating).

In example embodiments, if the degradation value associated with the present candidate dispatch state is greater than the degradation value associated with the previous candidate dispatch state, the optimization routine can include changing the direction of adjustment. For instance, if the present candidate dispatch state corresponds to an incremental increase in the number energy storage units to be coupled to the system relative to the previous candidate dispatch state, and to an increase in degradation value relative to the previous candidate dispatch state, the next identified candidate dispatch state can correspond to a decrease in the number of energy storage units to be coupled to the system. In this manner, the direction of adjustment can change based at least in part on the degradation value to identify a desired degradation value.

With reference now to the Figures, example embodiments of the present disclosure will now be discussed in detail. FIG. 1 depicts an example power system 100 that includes an energy storage system 110 according to example aspects of the present disclosure. The power system 100 can be a standalone power generation system or can be implemented as part of a renewable energy system, such as wind farm or solar farm.

The power system 100 can include a battery energy storage system (BESS) 110. The BESS 110 can include one or more battery energy storage units 112, such as battery cells or battery packs. The battery energy storage units 112 can contain one or more sodium nickel chloride batteries, sodium sulfur batteries, lithium ion batteries, nickel metal hydride batteries, or other similar devices. The battery energy storage units 112 can be coupled to a switching element (e.g. one or more contactors) selectively operable to couple the energy storage units 112 to the system 100. Although battery energy storage units 112 include individual battery cells coupled to a switching element, it will be appreciated that battery energy storage units 112 can include multiple battery cells coupled to the switching element. In addition, the present disclosure is discussed with reference to a battery energy storage system for purposes of illustration and discussion, those of ordinary skill in the art, using the disclosures provided herein, should understand that other energy storage devices (e.g. capacitors, fuel cells, etc.) can be used without deviating from the scope of the present disclosure.

The BESS 110 can include a battery management system (BMS) 115. The BMS 115 can include one or more electronic devices that monitor one or more of the battery energy storage units 112, such as by protecting the battery energy storage unit from operating outside a safe operating mode, monitoring a state of the battery energy storage unit, calculating and reporting operating data for the battery energy storage unit, controlling the battery energy storage unit environment, and/or any other suitable control actions. For example, in several embodiments, the BMS 115 is configured to monitor and/or control operation of one or more energy storage units 112. The BMS 115 can be, for example, a logic controller implemented purely in hardware, a firmware-programmable digital signal processor, or a programmable processor-based software-controlled computer.

The BESS 110 can optionally be coupled to a DC to DC converter 120. The DC to DC converter 120 can be a buck converter, boost converter, or buck/boost converter. The DC to DC converter 120 can convert a DC voltage at the DC bus 125 to a suitable DC voltage for providing power to or receiving power from the BESS 110. The DC bus 125 can be a standalone DC bus between the DC to DC converter 120 and the inverter 130. Alternatively, the DC bus 125 can be a DC bus of a two-stage power converter used to convert energy from a renewable energy source to suitable power for the AC grid 150.

The DC to DC converter can include one or more electronic switching elements, such as insulated gate bipolar transistors (IGBT). The electronic switching elements can be controlled (e.g. using pulse width modulation) to charge or to discharge the battery energy storage system 110. In addition, the electronic switching elements can be controlled to condition DC power received or provided to the BESS 115.

The power system can further include and inverter 130. The inverter 130 can be configured to convert DC power on the DC bus 125 to suitable AC power for application to utility grid 150 (e.g. 50 Hz or 60 Hz AC power). The inverter 130 can include one or more electronic switching elements, such as IGBTs. The electronic switching elements can be controlled (e.g. using pulse width modulation) to convert the DC power on the DC bus to suitable AC power for the grid 150. The inverter 130 can provide AC power to the grid 150 through a suitable transformer 140 and various other devices, such as switches, relays, contactors, etc. used for protection of the power system 100.

Figure 2:
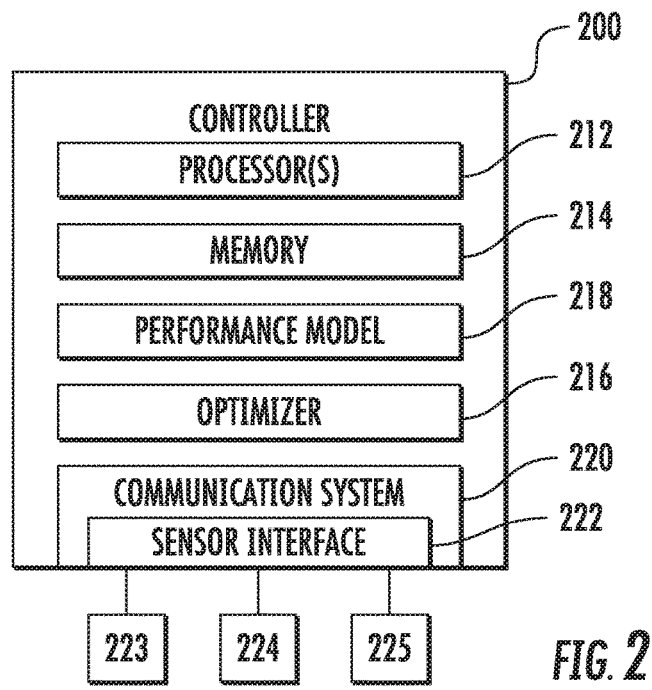
FIG. 2 depicts aspects of an example controller according to example embodiments of the present disclosure.
Figure 3:
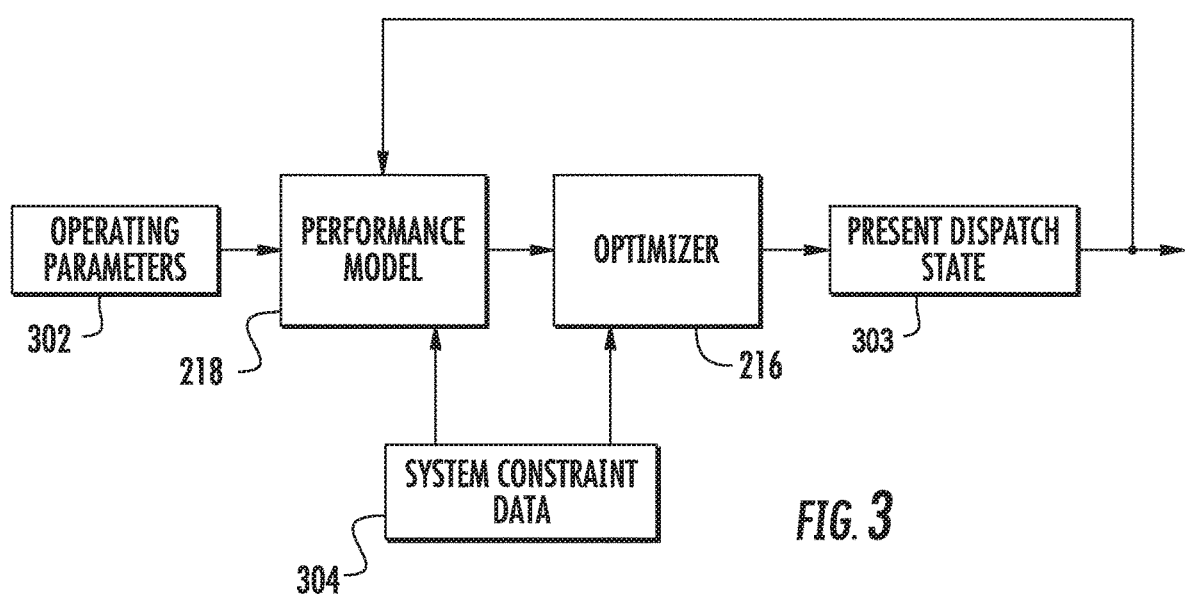
FIG. 3 depicts an example control topology for an example control system according to example embodiments of the present disclosure.

The power system 100 can also include a controller 200 that is configured to monitor and/or control various aspects of the power system 100 as shown in FIGS. 1, 2, and 3. For example, the controller 200 can be configured to control the energy storage system to selectively couple energy storage units to the system 100 based at least in part on a performance model according to example aspect of the present disclosure. In accordance with various embodiments, the controller 190 can be a separate unit (as shown) or can be part of the BMS 115 of the BESS 110.

Referring particularly to FIG. 2, controller 200 can have any number of suitable control devices. The controller 200 can be a system level controller (e.g., farm level controller) or a controller of one or more individual energy storage units. As illustrated, for example, controller 200 can include one or more processor(s) 212 and one or more memory device(s) 214 configured to perform a variety of computer-implemented functions and/or instructions (e.g., performing the methods, steps, calculations and the like and storing relevant data as disclosed herein). The instructions when executed by processor(s) 212 can cause processor(s) 212 to perform operations according to example aspects of the present disclosure. For instance, the instructions when executed by processor(s) 212 can cause processor(s) 212 to implement one or more control routines, such as the optimizer as will be discussed in more detail below.

Additionally, controller 200 can include a communications system 220 to facilitate communications between controller 200 and the various components of the system 100. Further, communications system 220 can include a sensor interface 222 (e.g., one or more analog-to-digital converters) to permit signals transmitted from one or more sensors 223, 224, and 225 to be converted into signals that can be understood and processed by processor(s) 212. It should be appreciated that sensors 223-225 can be communicatively coupled to communications system 220 using any suitable means, such as a wired or wireless connection. The signals can be communicated using any suitable communications protocol.

As such, processor(s) 212 can be configured to receive one or more signals from sensors 223-225. For instance, processor(s) 212 can receive signals indicative of the state of charge of energy storage units 102 from a monitoring device configured to monitor a state of charge of energy storage units 102 in energy storage system 100. Processor(s) 212 can also receive signals indicative of power delivery (e.g., amount of power charging/discharging) from additional sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor is also configured to compute advanced control algorithms and communicate to a variety of Ethernet or serial-based protocols (Modbus, OPC, CAN, etc.).

Additionally, the memory device(s) may generally comprise memory element(s) including, but not limited to, computer readable medium (e.g. random access memory (RAM)), computer readable non-volatile medium (e.g. read-only memory, or a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure processor(s) 212 to perform the various functions as described herein. The memory may be a separate component from the processor or may be included onboard within the processor.

Controller 200 can also include or store data associated with a performance model 218. Generally, the model 218 can model energy storage units 102 by describing expected behavior of the units under certain described circumstances and in view of various operating parameters (e.g. one or more of open circuit voltage, temperature, current, or contactor life associated with energy storage units 102). As will be described in more detail below, performance model 218 can be configured to determine a degradation value for a present set of dispatched energy storage units (e.g. present dispatch state), and degradation values for a plurality of candidate sets of energy storage units to be potentially be dispatched (e.g. candidate dispatch states).

Controller 200 can also include an optimizer 216. The optimizer 216 can be computer logic utilized to provide desired functionality, such as at least a portion of an optimization routine associated with energy storage system 100. Thus, the optimizer 216 can be implemented in hardware, firmware and/or software controlling a general purpose processor. In one embodiment, the optimizer 216 includes program code files stored on the storage device, loaded into memory and executed by a processor or can be provided from computer program products, for example, computer executable instructions that are stored in a tangible computer-readable storage medium such as RAM hard disk or optical or magnetic media. In particular, as will be described in greater detail below, the optimizer 216 to determine an optimum or near optimum dispatch state based at least in part on the performance model. As used herein, near optimum refers to within 25% of an optimum solution.

In some embodiments, optimizer 216 and/or the performance model 218 can further take into account one or more constraints. The one or more constraints can include a power demand or commitment, power, current, voltage characteristic, or temperature associated with energy storage units 102. In this manner, optimizer 216 can select one or more dispatch states as selected dispatch states based at least in part on the comparison of the degradation values and based at least in part on the constraints.

FIG. 3 depicts an example control topology 300 for an energy storage system according to example embodiments of the present disclosure. As depicted, performance model 218 can access, obtain, or receive various types of data, including operating parameters 302, and system constraint data 304. Operating parameters 302 and constraint data 304 can be provided from one or more sources. For instance, some data may be obtained by sensors 223-225. Some data may be accessed over a network (e.g., Internet) from various sources. For instance, when energy storage units 102 are remotely distributed on multiple electrical busses, operating parameters 302, and/or constraint data 304 may be accessed, at least in part, via a network. As indicated above, operating parameters 302 can include various data associated with an energy storage system, including data related to open circuit voltage, temperature, current (charge or discharge), and/or contactor life.

Constraint data 304 can include power demand data. A power demand can be a part of or determined based on a request for beneficial services such as peak shaving, frequency response, ramp rate control, purchasing and selling of energy, load following, energy arbitrage, and/or other grid services. The power demand can specify a requested amount of power and/or a requested duration. The power demand can specify certain performance parameters that are mandatory or requested (e.g., supplied power should be within a certain frequency range). Constraint data 304 can further include data that describes various constraints of an energy storage system. For example, system constraint data 304 can include data that describes one or more constraints relating to charge or discharge current, charge or discharge power, temperature and/or various other constraints associated with the energy storage system.

Further, in some implementations, operating parameters 302 and/or constraint data 304 can be determined at least in part from one or more feedback signals provided by one or more energy storage units to performance model 218 and/or optimizer 216. For example, the feedback signals can be provided by energy storage units 102 to performance model 218 via sensors 223-225 or other suitable technique. The feedback signals can include state of unit data that describes the status of various operating parameters or other present conditions associated with energy storage units 102. As an example, energy storage units 102 can provide state of unit data to performance model 218, which can include data that describes a present power output setpoint of each of the one or more energy storage units 102, a present effective power output by each of the one or more energy storage units 102, a present state of health of each of the one or more energy storage units 102, a present state of charge of each of the one or more energy storage units 102, internal temperatures, external temperatures, and/or expected change in temperatures at each of the one or more energy storage units 102, a present and/or expected efficiency for each of the one or more energy storage units 102, inverter information, and/or other data.

Performance model 218 can further receive or obtain data indicative of a present dispatch state 303 of the energy storage system and/or data indicative of one or more candidate dispatch states of the energy storage system. The present dispatch state 303 can specify one or more energy storage units that are coupled to the system, and that are decoupled from the system. The one or more candidate dispatch states can specify various combinations of energy storage units to potentially be coupled to the system, and decoupled from the system. In this manner, upon receiving the various operating parameters 302 and constraint data 304, performance model 218 can determine degradation values for the present dispatch state 303 and the one or more candidate dispatch states over one or more time periods. The degradation values can then be provided to optimizer 216.

In one example implementation, optimizer 216, upon receiving the degradation values, can be configured to perform a comparison of at least two of the degradation values during one or more time periods. Optimizer 216 can then be configured to select one or more dispatch states as selected dispatch states based at least in part on the comparison. As indicated above, optimizer 216 can be further configured to select the one or more selected dispatch states based at least in part on the constraint data. Optimizer 216 can then provide one or more signals indicative of the selected dispatch state to one or more energy storage units. A dispatch operation of the energy storage system can then be controlled based at least in part on the signal(s) In example embodiments, the signal(s) can further be provided back to performance model 218, such that one or more subsequent degradation values can be determined.

The optimizer can implement other suitable optimization techniques can be used without deviating from the scope of the present disclosure. For instance, in one embodiment, the optimizer can iteratively determine various dispatch states as selected states until an optimum or near optimum dispatch state for a present condition is satisfied.

Figure 4:
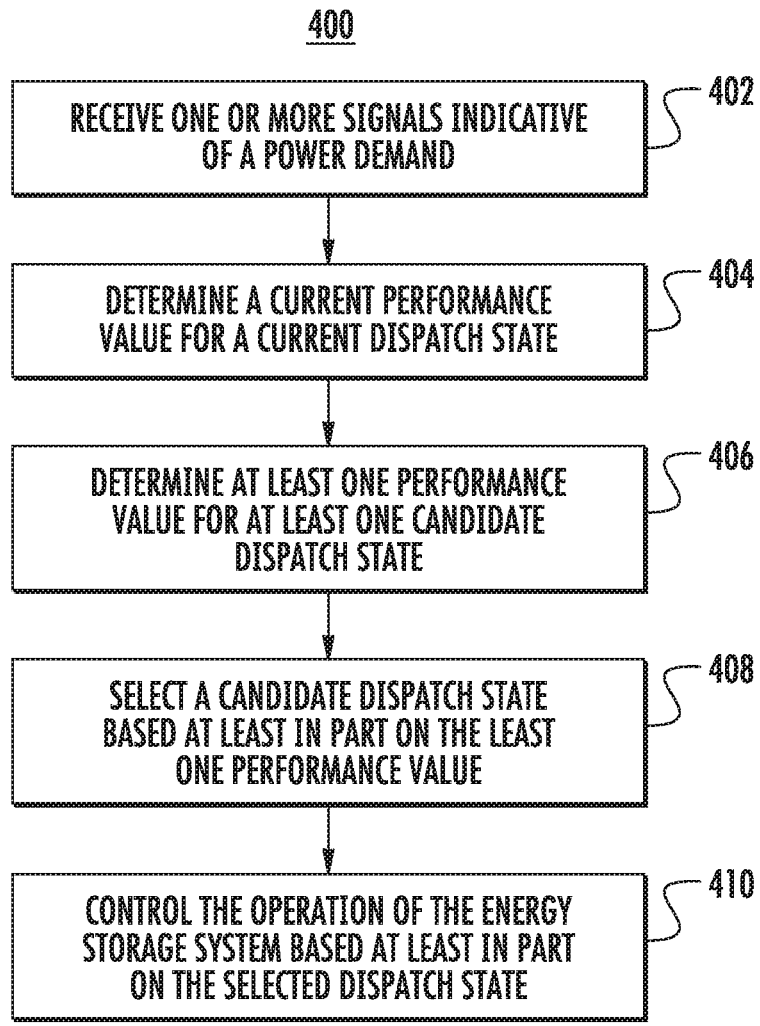
FIG. 4 depicts a flow diagram of an example method of controlling a dispatch operation of an energy storage system according to example embodiments of the present disclosure.

FIG. 4 depicts a flow diagram of an example method (400) of controlling a dispatch operation of an energy storage system according to example embodiments of the present disclosure. The method (400) can be implemented by one or more computing devices, such as one or more of the computing devices in FIG. 3. In addition, FIG. 4 depicts steps performed in a particular order for purposes of illustration and discussion, those of ordinary skill in the art, using the disclosures provided herein, will understand that various steps of any of the methods discussed herein can be adapted, modified, rearranged, omitted, or expanded in various ways without deviating from the scope of the present disclosure.

At (402), the method (400) can include receiving or accessing data indicative of a power demand or commitment. The power demand can specify a requested amount of power and/or a requested duration. The power demand can be determined to provide a requested grid service, such as peak shaving, frequency response, ramp rate control, purchasing and selling of energy, load following, energy arbitrage, and/or other grid services.

At (404), the method (400) can include receiving data indicative of a present dispatch state associated with an energy storage system. In particular, the present dispatch state can specify the energy storage units that are presently coupled to the system and/or the energy storage units that are presently decoupled from the system.

At (406), the method (400) can include identifying one or more candidate dispatch states associated with the energy storage system. A candidate dispatch state can specify one or more energy storage units to be coupled to an energy storage system. In particular implementations, the candidate dispatch state can further specify one or more energy storage units to be decoupled from the energy storage system. Each candidate dispatch state can be different from the present dispatch state.

In example embodiments, identifying one or more candidate dispatch states can include identifying every possible candidate dispatch state. In this manner, each possible candidate dispatch state can be identified during one or more time periods. In alternative embodiments, identifying one or more candidate dispatch states can include incrementally identifying one or more candidate dispatch states during one or more time periods. Such embodiments are described in more detail below with reference to FIG. 5.

At (408) of FIG. 4, the method (400) can include selecting a candidate dispatch state as a selected dispatch state based at least in part on a performance model. The performance model can be configured to model the performance of the energy storage system as a function of one or more operating parameters while the energy storage system is operating in accordance with a candidate dispatch state. For instance, the performance model can describe expected behavior of the dispatched energy storage units under certain described circumstances and in view of various operating parameters, such as temperature, open circuit voltage, contactor life, charge or discharge current, and/or various other suitable operating parameters associated with the dispatched energy storage units.

As described above, in example embodiments, a candidate dispatch state can be selected further based on one or more constraints. In particular, the one or more constraints can include data relating to power demand, battery power, battery current, battery temperature, etc. The constraints can vary over time. For instance, a power demand from a grid or other source may change during different times of the day or year. In addition, various performance characteristics of the energy storage units in the energy storage system may change over time. For instance, unit efficiency may decrease throughout the lifetime of an energy storage unit. In this manner, a candidate dispatch state may be selected as a selected dispatch state only if operating the energy storage system in accordance with the candidate dispatch state would cause the energy storage system to operate within the bounds of the one or more constraints. For instance, a candidate dispatch state may only be selected if the energy storage system would be able to meet the power demand when operating in accordance with the candidate dispatch state.

In example embodiments, the constraints can further include data related to the states of charge of the energy storage units in the energy storage system. Distributed energy storage units can develop state of charge imbalances due at least in part to poor dispatch of the energy storage units to meet the power demand. In such embodiments, the candidate dispatch state can be selected based at least in part on the state of charge data. In particular, the constraint can specify a desired state difference value. The desired state difference value can be indicative of a maximum desired difference between the states of charge of the dispatched energy storage units. For instance, the desired state difference value can correspond to an average state of charge of each energy storage unit in the system. In this manner, one or more energy storage units can be coupled to or decoupled from the system based at least in part on the states of charge of the one or more energy storage units and the desired state difference value.

The candidate dispatch state can be selected by performing an optimization routine associated with the performance model. For instance, the optimization routine can include selecting the candidate dispatch state having the smallest associated degradation value.

In example embodiments, the optimization routine can include identifying a candidate dispatch state during one or more time periods by incrementally adjusting a number of energy storage units to be coupled to the system. A degradation value may be determined for each identified candidate dispatch state (e.g. for each incremental adjustment) based on the performance model. The optimization routine can further include comparing, during each time period, the degradation value associated with the candidate dispatch state identified in the present time period to a candidate dispatch state identified in a previous time period. In one embodiment, the optimization routine can further include selecting the present candidate dispatch state as a selected dispatch state when the degradation value associated with the candidate dispatch state identified in the present time period is less than the degradation value associated with the candidate dispatch state identified in the previous time period.

Figure 5:
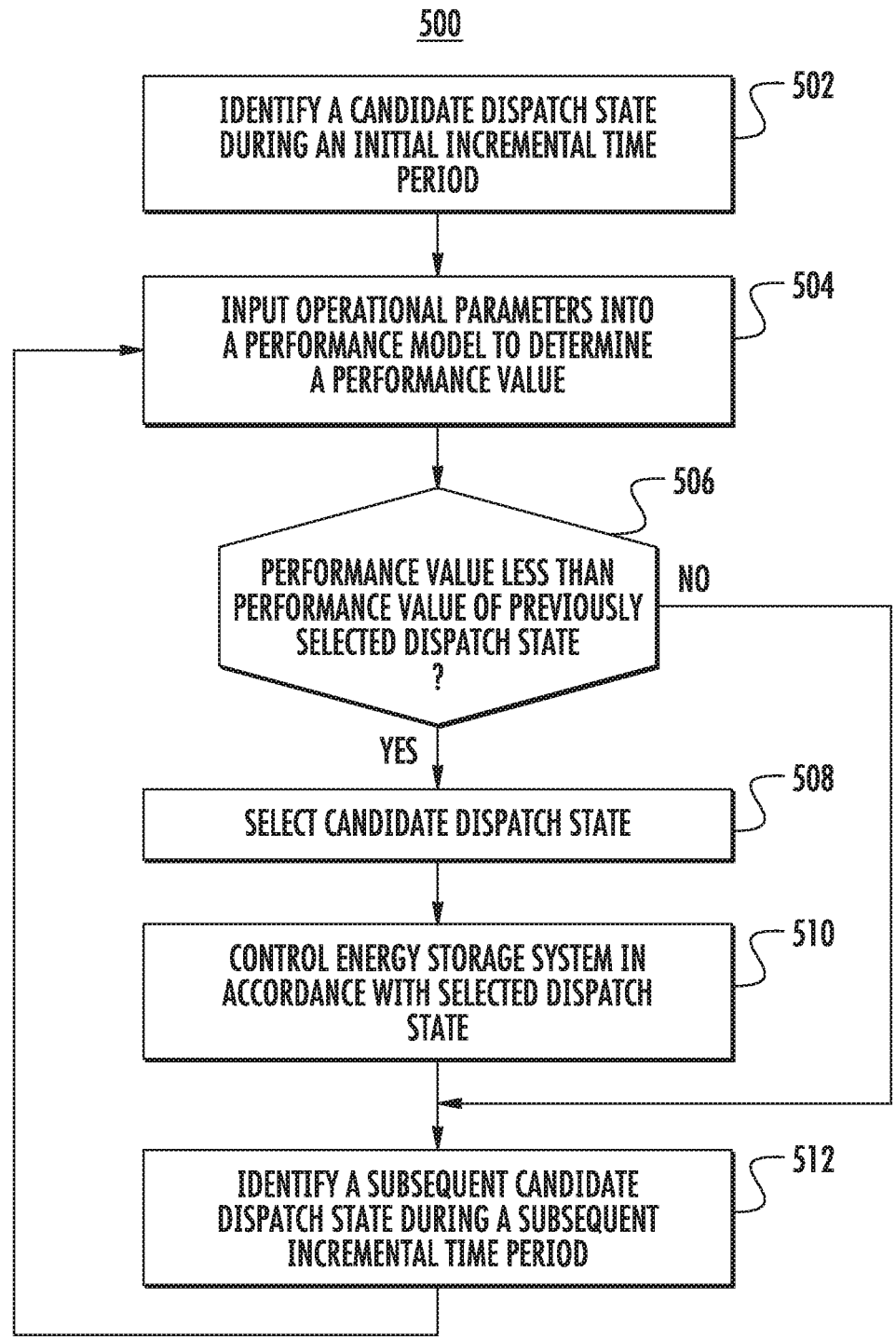
FIG. 5 depicts a flow diagram of an example method of controlling a dispatch state of an energy storage system over one or more incremental time periods according to example embodiments of the present disclosure.

For instance, FIG. 5 depicts a flow diagram of an example method (500) of an optimization routine for selecting a candidate dispatch state as a selected dispatch over one or more incremental time periods. At (502), method (500) can include identifying a candidate dispatch state during an initial time period. The candidate dispatch state can specify a number of energy storage units to be coupled to the system. For instance, the candidate dispatch state can be identified by incrementally adjusting the number of energy storage units to be coupled to the system relative to the number of energy storage units specified by the present dispatch state (e.g. the number of energy storage units presently coupled to the system).

In example embodiments, the incremental adjustment of energy storage units can be a random incremental adjustment, such that the energy storage units to be coupled to or decoupled from the system are chosen in an arbitrary, random manner. In alternative embodiments, the incremental adjustments can be performed based at least in part on one or more operating conditions associated with the energy storage system. For instance, an order of adjustment can be determined based at least in part on the type of energy storage units in the energy storage system, one or more operating parameters associated with the energy storage units, constraint data associated with the energy storage system, and/or various other suitable factors. In a particular implementation, an order of adjustment can be identified at least in part from a lookup table stored in a memory associated with the energy storage system. For instance, the lookup table can provide one or more orders in which to couple or decouple energy storage units to the system in view of the various operating conditions associated with the energy storage system. In example embodiments, the lookup table can take into account one or more energy storage units that have been previously coupled to the system. For instance, an order of adjustment can be determined such that an energy storage unit is not coupled to the system if the amount of time since the energy storage unit was most recently decoupled from the system is less than a threshold.

At (504), the method (500) can include inputting one or more operating parameters into a performance model to determine a degradation value associated with the candidate dispatch state. As indicated above, the operating parameters can include data related to open circuit voltage, temperature, current, contactor life, etc. associated with the energy storage units specified in the candidate dispatch state. Such data can be used to determine an expected degradation value associated with the candidate dispatch state.

At (506), the method (500) can include comparing the determined degradation value with the degradation value of a previous dispatch state. For instance, during the initial time period, the degradation value can be compared to the present degradation value of (404). During subsequent time periods, the degradation value can be compared to the degradation value associated with the most recently selected dispatch state.

When the degradation value is less than the degradation value of the previous dispatch state, the method (500) can include selecting the candidate dispatch state as a selected dispatch state (508). At (510), the method (500) can include controlling the energy storage system in accordance with the selected dispatch state. In this manner, one or more switches coupled to one or more energy storage units can be selectively controlled to couple the one or more energy storage units to the system in accordance with the selected dispatch state, such that the number of energy storage units coupled to the system corresponds to the number of energy storage units specified in the selected dispatch state.

At (512), the method (500) can include identifying a subsequent candidate dispatch state during a subsequent incremental time period. In particular, upon the expiration of a previous time period (e.g. the initial time period of (502)), a subsequent candidate dispatch state can be identified by incrementally adjusting the number of energy storage units to be coupled to the system relative to the most recently selected dispatch state. The method (500) can then return to (504).

Referring back to (506), if the degradation value is not less than the degradation value associated with the previously selected dispatch state, the method (500) can bypass (508) and (510), and can proceed directly to (512). In this manner, if the degradation value is not less than the previously selected degradation value, the candidate dispatch state is not selected.

Referring back to FIG. 4 at (410), method (400) can include controlling the operation of the energy storage system based at least in part on the selected dispatch state. For instance, the energy storage system can be controlled to operate in accordance with the selected dispatch states. For instance, the energy storage system can be controlled by selectively controlling one or more switches (e.g. contactors) coupled to one or more energy storage units to couple the one or more energy storage units to the system in accordance with the selected dispatch state, such that the number of energy storage units coupled to the system corresponds to the number of energy storage units specified in the selected dispatch state.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of actively controlling a dispatch operation of an energy storage system, the method comprising:
   receiving, by one or more control devices, data indicative of a present dispatch state associated with an energy storage system, the energy storage system comprising a plurality of battery energy storage units couplable to the energy storage system via respective switching elements, the present dispatch state specifying a first subset of the plurality of battery energy storage units presently coupled to the energy storage system;
   identifying, by the one or more control devices, one or more candidate dispatch states associated with the energy storage system, each of the one or more candidate dispatch states comprising a second subset of the plurality of battery energy storage units being different from the first subset of battery energy storage units;
   receiving one or more feedback signals from the plurality of battery energy storage units, the one or more feedback signals being indicative of one or more operating parameters of the plurality of battery energy storage units;
   identifying, by the one or more control devices, at least one decoupled battery energy storage unit of the plurality of battery energy storage units previously coupled to the energy storage system;
   identifying, by one or more control devices, an amount of time since the at least one decoupled battery energy storage unit was most recently decoupled from the energy storage system which is less than a time threshold;
   selecting, by the one or more control devices, at least one of the one or more candidate dispatch states as a selected dispatch state based at least in part on a performance model, wherein the selected dispatch state specifies the battery energy storage units to be coupled to the energy storage system and the battery energy storage units to be decoupled from the energy storage system, wherein the at least one decoupled battery energy storage unit having the amount of time which is less than the time threshold is precluded from inclusion with the battery energy storage units to be coupled to the energy storage system, and wherein the performance model models the performance of the one or more candidate dispatch states as a function of the one or more operating parameters and based at least in part on one or more constraints; and
   controlling, by the one or more control devices, operation of the switching elements to couple one or more of the second subsets of battery energy storage units to the energy storage system based at least in part on the selected dispatch state and decoupling the first subset of battery energy storage units from the energy storage system.

2. The method of claim 1, wherein the one or more constraints comprise power demand constraints, energy storage system level constraints, battery energy storage unit constraints, or combinations thereof.

3. The method of claim 1, wherein the one or more constraints comprise energy storage system level constraints comprising charge current, discharge current, charge power, discharge power, temperature, or combinations thereof, and wherein the one or more constraints further comprise battery energy storage unit constraints based at least in part on state of charge associated with one or more of the plurality of battery energy storage units.

4. The method of claim 1, wherein selecting, by the one or more control devices, the candidate dispatch state as a selected dispatch state based at least in part on a performance model, comprises:
determining, by the one or more control devices, a degradation value for each of the one or more candidate dispatch states based on the performance model; and
selecting, by the one or more control devices, one of the candidate dispatch states as the selected dispatch state based at least in part on the degradation value; and
wherein identifying, by the one or more control devices, the selected dispatch state based at least in part on the degradation value comprises performing an optimization routine based at least in part on the performance model.

5. The method of claim 4, wherein the optimization routine comprises:
during each of a plurality of time periods, identifying, by the one or more control devices, a candidate dispatch state by incrementally adjusting a number of battery energy storage units to be coupled to the system, wherein incrementally adjusting a number of battery energy storage units to be coupled to the system comprises decreasing or increasing a number of battery energy storage units to be coupled to the system; and
for each candidate dispatch state, determining, by the one or more control devices, a degradation value for the candidate dispatch state associated with the incremental adjustment.

6. The method of claim 5, wherein, increasing a number of battery energy storage units to be coupled to the energy storage system is based on an order of adjustment, wherein the order of adjustment is based, at least in part, on whether an amount of time one or more battery energy storage units of the plurality of battery energy storage units have been decoupled from the energy storage system relative to the time threshold.

7. The method of claim 1, wherein the one or more operating parameters comprise data indicative of an open circuit voltage associated with one or more battery energy storage units coupled to the energy storage system, data indicative of a temperature associated with one or more battery energy storage units coupled to the energy storage system, data indicative of an electrical current associated with one or more battery energy storage units coupled to the energy storage system, data indicative of a health of one or more of the plurality of switching elements, data indicative of a state of charge associated with one or more battery energy storage units coupled to the energy storage system, or combinations thereof.

8. The method of claim 1, wherein the one or more operating parameters comprise state of unit data associated with the plurality of battery energy storage units, and wherein the state of unit data comprises data indicative of a power output setpoint of one or more of the battery energy storage units, data indicative of an effective power output of one or more of the battery energy storage units, data indicative of a state of health of one or more of the battery energy storage units, a state of charge of one or more of one or more of the battery energy storage units, data indicative of a temperature associated with one or more of the battery energy storage units, data indicative of an efficiency of one or more of the battery energy storage units, or combinations thereof.

9. The method of claim 1, wherein:
the operating parameters comprise a state of charge associated with each of the plurality of battery energy storage units; and
the one or more constraints comprise a difference between a state of charge associated with at least a first state of charge associated with a first battery energy storage unit coupled to the energy storage system and a second state of charge associated with a second battery energy storage unit coupled to the energy storage system.

10. The method of claim 1, wherein the one or more constraints comprise power demand constraints determined based on services comprising peak shaving, frequency response, ramp rate control, purchasing and selling of energy, load following, energy arbitrage, or combinations thereof.

11. An energy storage system comprising:
a plurality of battery energy storage units; and
a system controller communicatively coupled to a plurality of contactors used to selectively couple the plurality of battery energy storage units to the energy storage system, the system controller comprising at least one processor and a non-transitory computer-readable medium storing instructions that, when executed by the at least one processor, cause the system controller to perform operations, the operations comprising:
receiving data indicative of a present dispatch state associated with the energy storage system, the present dispatch state specifying a first subset of the plurality of battery energy storage units presently coupled to the energy storage system;
identifying one or more candidate dispatch states associated with the energy storage system, each of the one or more candidate dispatch states comprising a second subset of the plurality of battery energy storage units being different from the first subset of battery energy storage units;
receiving one or more feedback signals from the plurality of battery energy storage units, the one or more feedback signals being indicative of one or more operating parameters of the plurality of battery energy storage units;
identifying at least one decoupled battery energy storage unit of the plurality of battery energy storage units previously coupled to the energy storage system;
identifying an amount of time since the at least one decoupled battery energy storage unit was most recently decoupled from the energy storage system which is less than a time threshold;
selecting at least one of the one or more candidate dispatch states as a selected dispatch state based at least in part on a performance model, wherein the selected dispatch state specifies the battery energy storage units to be coupled to the energy storage system and the battery energy storage units to be decoupled from the energy storage system, wherein the at least one decoupled battery energy storage unit having the amount of time which is less than the time threshold is precluded from inclusion with the battery energy storage units to be coupled to the energy storage system, and wherein the performance model models the performance of the one or more candidate dispatch states as a function of the one or more operating parameters and based at least in part on one or more constraints; and
controlling operation of the contactors to couple one or more of the second subsets of battery energy storage units to the energy storage system based at least in part on the selected dispatch state and decoupling the first subset of battery energy storage units from the energy storage system.

12. The energy storage system of claim 11, wherein the one or more operating parameters are based on a contactor life associated with each of the plurality of battery energy storage units and wherein selecting the candidate dispatch state as a selected dispatch state based at least in part on a performance model comprises:
   determining a degradation value for each of the one or more candidate dispatch states; and
   selecting the candidate dispatch state as the selected dispatch state based at least in part on the degradation value.

13. The energy storage system of claim 12, wherein identifying the selected dispatch state based at least in part on the degradation value comprises performing an optimization routine based at least in part on the performance model.

14. The energy storage system of claim 13, wherein the optimization routine comprises:
   during each of a plurality of time periods, identifying a candidate dispatch state by incrementally adjusting a number of battery energy storage units to be coupled to the system; and
   for each candidate dispatch state, determining a degradation value for the candidate dispatch state associated with the incremental adjustment.

15. The energy storage system of claim 14, wherein the optimization routine further comprises:
   incrementally adjusting the number of battery energy storage units to be coupled to the energy storage system based, at least in part, on an order of adjustment, wherein the order of adjustment is based on whether an amount of time that each of the plurality of battery energy storage units have been decoupled from the energy storage system relative to the time threshold;
   during each time period of the plurality of time periods, comparing the degradation value associated with the candidate dispatch state identified in the present time period with the degradation value associated with the candidate dispatch state identified in the previous time period; and
   selecting the present candidate dispatch state as a selected dispatch state when the degradation value associated with the candidate dispatch state identified in the present time period is less than the degradation value associated with the candidate dispatch state identified in the previous time period.

16. A system controller for controlling one or more battery energy storage units in an energy storage system, the system controller comprising at least one processor and a non-transitory computer-readable medium storing instructions that, when executed by the at least one processor, cause the system controller to perform operations, the operations comprising:
   receiving data indicative of a present dispatch state associated with an energy storage system, the energy storage system comprising a plurality of battery energy storage units couplable to the energy storage system via respective switching elements, the present dispatch state specifying a first subset of the plurality of battery energy storage units presently coupled to the energy storage system;
   identifying one or more candidate dispatch states associated with the energy storage system, comprising a second subset of the plurality of battery energy storage units being different from the first subset of battery energy storage units;
   receiving one or more feedback signals from the plurality of battery energy storage units, the one or more feedback signals being indicative of one or more operating parameters of the plurality of battery energy storage units;
   identifying at least one decoupled battery energy storage unit of the plurality of battery energy storage units previously coupled to the energy storage system;
   identifying an amount of time since the at least one decoupled battery energy storage unit was most recently decoupled from the energy storage system which is less than a time threshold;
   selecting at least one of the one or more candidate dispatch states as a selected dispatch state based at least in part on a performance model, wherein the selected dispatch state specifies the of battery energy storage units to be coupled to the energy storage system and the battery energy storage units to be decoupled from the energy storage system, wherein the at least one decoupled battery energy storage unit having the amount of time which is less than the time threshold is precluded from inclusion with the battery energy storage units to be coupled to the energy storage system, and wherein the performance model models the performance of the one or more candidate dispatch states as a function of the one or more operating parameters and based at least in part on one or more constraints; and
   controlling operation of the switching elements to couple one or more of the second subsets of battery energy storage units to the energy storage system based at least in part on the selected dispatch state and decoupling the first subset of battery energy storage units from the energy storage system.

17. The system controller of claim 16, wherein selecting the candidate dispatch state as a selected dispatch state based at least in part on a performance model comprises:
   determining a degradation value for each of the one or more candidate dispatch states; and
   selecting the candidate dispatch state as the selected dispatch state based at least in part on the degradation value.

18. The system controller of claim 16, wherein identifying the selected dispatch state based at least in part on the degradation value comprises performing an optimization routine based at least in part on the performance model, and wherein the optimization routine comprises:
   during each of a plurality of time periods, identifying a candidate dispatch state by incrementally adjusting a number of battery energy storage units to be coupled to the system; and
   for each candidate dispatch state, determining a degradation value for the candidate dispatch state associated with the incremental adjustment.

19. The system controller of claim 18, wherein the optimization routine further comprises:
   during each time period of the plurality of time periods, comparing the degradation value associated with the candidate dispatch state identified in a present time period with the degradation value associated with the candidate dispatch state identified in a previous time period; and
   selecting the present candidate dispatch state as a selected dispatch state when the degradation value associated with the candidate dispatch state identified in the present time period is less than the degradation value associated with the candidate dispatch state identified in the previous time period.

* * * * *